UNITED STATES PATENT OFFICE.

ERWIN E. A. G. MEYER, OF DETROIT, MICHIGAN, ASSIGNOR TO MORGAN & WRIGHT, A CORPORATION OF MICHIGAN.

TREATMENT OF VULCANIZABLE PLASTICS.

1,157,887. Specification of Letters Patent. Patented Oct. 26, 1915.

No Drawing. Application filed March 12, 1915. Serial No. 13,914.

*To all whom it may concern:*

Be it known that I, ERWIN E. A. G. MEYER, a subject of the Emperor of Germany, residing at Detroit, county of Wayne, State of Michigan, have invented certain new and useful Improvements in the Treatment of Vulcanizable Plastics, of which the following is a full, clear, and exact description.

This invention relates to the treatment of vulcanizable plastic and has for an object the elimination of porosity therein.

In the manufacture of rubber goods, particularly those formed in molds, great loss and inconvenience is incurred by reason of the formation of blisters, cells or pores in the material, resulting from the expansion of the entrapped gases and liquids in the stock.

The crude rubber is first cleaned in washing machinery, the operation of which consists in subjecting small pieces of stock to the action of rollers and flowing water, the rollers loosening and exposing any foreign particles which may be embedded in the rubber, and the water washing them away. Unvulcanized rubber will absorb a large amount of water, and consequently becomes saturated by the washing process. To remove this moisture it is customary to dry the stock for a protracted period in hot chambers. It has been found, however, that even after a protracted drying some water remains in the stock, which, when the articles are vulcanized, vaporizes and forms blisters. The next step in the preparation of the stock is the process of incorporating with the rubber various compounding ingredients. This is accomplished on so-called "mixing-rolls" between which the stock is kneaded and manipulated over and over simultaneously with the addition of the added material. This manipulation necessarily results in entrapping a large quantity of air in the mass. Finally when the prepared material is submitted to heat for vulcanization all the liquids and gases above mentioned expand, causing pores and cavities throughout the article. In addition to those which are entrapped in the plastic mass during manipulation, gases are generated in the compound while in the mold when heat is applied for the purpose of vulcanizing the article. It may thus be seen that to produce an article without pores or blisters, not only must entrapped air and liquids be removed, but also any gases which may generate in the plastic mass. This removal must take place before vulcanization begins, or while the material is in a semi-liquid or viscous state, inasmuch as vulcanization acts to set or render the material impervious, and affecting the surface first as it does, any escape from the interior of the mass is prevented. Various means have been tried to obviate these difficulties, and some of them have succeeded in reducing the porosity. Heretofore however, no one has succeeded in eliminating it, particularly in the so-called "molded" articles.

My invention consists in subjecting the article in its mold, to a preliminary heat sufficient to reduce the material to a semi-liquid or viscous state and the application of mechanical pressure thereto which expresses the otherwise entrapped gases.

In the practice of my method I first compound the rubber according to the usual procedure. I then place it in molds, using sufficient material to permit compression to the required density when the sections of the molds are tightly closed. Steam at a temperature which will heat the rubber to a semi-liquid state, but not vulcanize it, is admitted to the molds, and at the same time pressure is applied on the molds by hydraulic or other mechanical means.

I have found that the temperature produced by steam at five pounds pressure gives a satisfactory heat for my purpose, but I do not wish to limit myself to this temperature, as it is possible to accomplish my result at a slightly lower or higher degree than that mentioned. It is only necessary to have a temperature sufficient to soften the rubber without vulcanization, and slight variations therein may be compensated by corresponding variations in the period of applying the pressure.

While I have mentioned steam as the heat-conveying medium, I do not limit myself thereto as any other medium capable of producing a definite uniform degree of temperature is equally suitable.

Having raised the temperature to the desired degree I apply the mechanical pressure to the mold. I do not limit myself to any particular pressure, as it is, of course, dependent on the shape, volume, and constituents of the article to be treated. In the case of thin regularly shaped articles much less pressure is required than when the article is thick or of irregular contour, as in the case of an automobile tire. Throughout the application of the mechanical pressure the preliminary softening heat of the required degree is maintained substantially uniform, thus keeping the stock being treated in a uniformly semi-liquid or viscous state. It is absolutely essential to properly carry out my invention that the preliminary heat be kept below the degree at which the vulcanizing action begins to change the aggregate state of the compound, since, once that temperature in the compound is reached a permanent set is produced and the fluids are thereby entrapped in the stock. The required period of application of the pressure varies in different cases. For instance, I have found that in the case of small articles a mechanical pressure maintained for five minutes produces a perfectly solid article, while in other cases 45 minutes are necessary to accomplish the desired result.

It is also preferable with certain articles, as for instance automobile tires, to open or loosen the mold after the application of the pressure, or otherwise provide means to permit the expressed fluids to escape to the atmosphere. The effective treatment of small articles with plane surfaces, however, requires no subsequent releasing of the mold sections, all fluids readily escaping through the overflow of the mold.

By my method, I have produced perfectly solid articles from rubber compounds containing as high a water content as 10%, while by the old method articles produced from the same stock were absolutely worthless. It is even possible by my method to utilize rubber taken directly from the washers, without any intermediate drying thereof, and I have produced from such stock perfect articles with no porosity whatever.

Having thus described my invention, what I claim and desire to protect by Letters Patent is:

1. The method of producing vulcanized rubber articles comprising the following steps: first, subjecting the mold containing the material to mechanical pressure and to a substantially constant temperature below that necessary to produce vulcanization for a definite period of time, and then raising the temperature to produce the required vulcanization.

2. The method of producing vulcanized rubber articles comprising the following steps: first, subjecting the mold containing the material to mechanical pressure and to a substantially constant temperature below that necessary to produce vulcanization for a definite period of time, then releasing the pressure on the mold, and finally raising the temperature to produce the required vulcanization.

Signed at Detroit, county of Wayne, and State of Michigan, this 6th day of March, 1915.

ERWIN E. A. G. MEYER.

Witnesses:
 JOHN CARLSON,
 E. LA BUSCHEWSKY.